(12) United States Patent
Kalyanasundaram et al.

(10) Patent No.: US 8,873,490 B2
(45) Date of Patent: Oct. 28, 2014

(54) UPLINK CONTROL CHANNEL RESOURCE ALLOCATION FOR SEMI-PERSISTENT SCHEDULING OF USER EQUIPMENT

(75) Inventors: Suresh Kalyanasundaram, Bangalore (IN); Vihang G. Kamble, Bangalore (IN); Naveen Arulselvan, Raman Nagar (IN); Balamurali Natarajan, JP Nagar 6$^{th}$ Phase (IN)

(73) Assignee: Nokia Siemens Networks Oy, Espoo (FI)

( * ) Notice: Subject to any disclaimer, the term of this patent is extended or adjusted under 35 U.S.C. 154(b) by 139 days.

(21) Appl. No.: 13/546,373

(22) Filed: Jul. 11, 2012

(65) Prior Publication Data

US 2013/0242883 A1    Sep. 19, 2013

(30) Foreign Application Priority Data

Mar. 15, 2012   (IN) .............................. 756/DEL/2012

(51) Int. Cl.
*H04W 4/00*   (2009.01)

(52) U.S. Cl.
USPC ......................................................... 370/329

(58) Field of Classification Search
None
See application file for complete search history.

(56) References Cited

U.S. PATENT DOCUMENTS

| | | | |
|---|---|---|---|
| 7,912,007 B2 | 3/2011 | Fan et al. | |
| 2009/0290538 A1* | 11/2009 | Kim et al. | 370/328 |
| 2010/0195629 A1 | 8/2010 | Chen et al. | |
| 2011/0228731 A1* | 9/2011 | Luo et al. | 370/329 |
| 2012/0044891 A1* | 2/2012 | Yang et al. | 370/329 |
| 2012/0063399 A1* | 3/2012 | Kiyoshima et al. | 370/329 |
| 2013/0070689 A1* | 3/2013 | Liu et al. | 370/329 |
| 2013/0272258 A1* | 10/2013 | Lee et al. | 370/329 |

FOREIGN PATENT DOCUMENTS

| | | |
|---|---|---|
| WO | WO 2011/093758 A1 | 8/2011 |
| WO | WO 2012/047908 A1 | 4/2012 |

OTHER PUBLICATIONS

3GPP TS 36.211 V10.4.0; "3$^{rd}$ Generation Partnership Project; Technical Specification Group Radio Access Network; Evolved Universal Terrestrial Radio Access (E-UTRA); Physical Channels and Modulation (Release 10)"; Dec. 2011; whole document (101 pages).
3GPP TS 36.300 V11.0.0; "3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)"; Dec. 2011; whole document (194 pages).

(Continued)

*Primary Examiner* — Chi Pham
*Assistant Examiner* — Fahmida Chowdhury
(74) *Attorney, Agent, or Firm* — Harrington & Smith

(57) ABSTRACT

A method includes determining semi-persistent scheduling acknowledge/negative acknowledge (SPS AN) resources; configuring as a first metric for each SPS AN resource a number of user equipments (UEs) for which the SPS AN resource has been configured but is not activated; configuring as a second SPS AN resource a count of a number of sub-frames in which the SPS AN resource has been activated for a UE; configuring as a third metric for each SPS AN resource a number of UEs for which the resource is configured but some other SPS AN resource is allocated; forming a fourth metric using the first, second and third metrics; selecting N SPS AN resources from the SPS AN resources based at least on the fourth metric; and selecting one of the N SPS AN resources based at least on the fourth metric when the UE is activated for SPS operation.

20 Claims, 7 Drawing Sheets

| PUCCH RESOURCE INDEX | # SUB-FRAMES IN WHICH THE RESOURCE IS NOT AVAILABLE BECAUSE IT HAS ALREADY BEEN ACTIVATED FOR A UE | # UEs FOR WHICH THE RESOURCE HAS BEEN CONFIGURED, BUT SPS IS NOT ACTIVATED | # UEs FOR WHICH THE RESOURCE HAS BEEN CONFIGURED, BUT SPS IS ACTIVATED BY ALLOCATING A DIFFERENT RESOURCE | WEIGHTED SUM OF THE THREE METRICS |
|---|---|---|---|---|
| 1 | x | y | a | w1*x+w2*y+w3*a |
| 2 | z | w | b | w1*z+w2*w+w3*b |
| ... | | | | |
| N | | | | |

12F

(56) References Cited

OTHER PUBLICATIONS

3GPP TS 36.213 V10.4.0; "3$^{rd}$ Generation Partnership Project; Technical Specification Group Radio Access Network; Evolved Universal Terrestrial Radio Access (E-UTRA); Physical layer procedures (Release 10)"; Dec. 2011; whole document (125 pages).

3GPP TS 36.331 V10.4.0; "3$^{rd}$ Generation Partnership Project; Technical Specification Group Radio Access Network; Evolved Universal Terrestrial Radio Access (E-UTRA); Radio Resoucre Control (RRC; Protocol specification (Release 10)"; Dec. 2011; whole document (296 pges).

* cited by examiner

| PUCCH RESOURCE INDEX | # SUB-FRAMES IN WHICH THE RESOURCE IS NOT AVAILABLE BECAUSE IT HAS ALREADY BEEN ACTIVATED FOR A UE | # UEs FOR WHICH THE RESOURCE HAS BEEN CONFIGURED, BUT SPS IS NOT ACTIVATED | # UEs FOR WHICH THE RESOURCE HAS BEEN CONFIGURED, BUT SPS IS ACTIVATED BY ALLOCATING A DIFFERENT RESOURCE | WEIGHTED SUM OF THE THREE METRICS |
|---|---|---|---|---|
| 1 | x | y | a | w1*x+w2*y+w3*a |
| 2 | z | w | b | w1*z+w2*w+w3*b |
| ⋮ | | | | |
| N | | | | |

UPLINK CONTROL CHANNEL RESOURCE ALLOCATION FOR SEMI-PERSISTENT SCHEDULING OF USER EQUIPMENT

CROSS REFERENCE TO RELATED APPLICATIONS

This application claims the benefit under 35 U.S.C. §119 of Indian Patent Application No. 756/DEL/2012, filed on Mar. 15, 2012 in India, the disclosure of which is hereby incorporated by reference in its entirety.

TECHNICAL FIELD

The exemplary and non-limiting embodiments of this invention relate generally to wireless communication systems, methods, devices and computer programs and, more specifically, relate to control channel resource allocation, a physical uplink control channel (PUCCH), a physical downlink control channel (PDCCH), semi-persistent scheduling (SPS), and to acknowledge (ACK)/negative acknowledge (NACK), or more simply AN, uplink (UL) resource scheduling.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

In 3GPP long term evolution (LTE) the evolved NodeB (eNB) allocates physical layer resources for uplink (UL, to the eNB) and downlink (DL, from the eNB) shared channels. The physical layer resources include physical resource blocks (PRB) and a modulation coding scheme (MCS). The MCS determines the bit rate, and thus the capacity, of the PRBs. Allocations may be valid for one or more transmission time intervals (TTIs).

The use of semi-persistent scheduling (SPS) reduces the needed control channel signaling and thus the overall signaling overhead. As may be appreciated, if every resource allocation to a user equipment (UE) was individually signaled, the overhead could become unacceptably large. For example, in a voice over IP (VoIP) application, which can also be referred to as a VoLTE application, a DL frame could occur every 20 milliseconds. If each downlink frame were to be signaled individually the control channel bandwidth would need to be significantly increased. However, with SPS the eNB is enabled to establish an ongoing (persistent or semi-persistent) resource allocation for a UE that remains in place until changed. SPS can be used for both the UL and the DL.

SUMMARY

In a first aspect thereof the exemplary embodiments of this invention provide a method that comprises determining a set of semi-persistent scheduling acknowledge/negative acknowledge (SPS AN) resources; configuring as a first metric for each member of the set of SPS AN resources a count of a number of user equipments (UEs) for which the SPS AN resource has been configured but for which SPS is not activated; configuring as a second metric for each member of the set of SPS AN resources a count of a number of sub-frames in which the SPS AN resource has been activated for a UE; configuring as a third metric for each member of the set of SPS AN resources a count of a number of UEs for which the particular SPS AN resource is configured but some other SPS AN resource is allocated during SPS activation; forming a fourth metric for each member of the set of SPS AN resources as a combination of the first metric, the second metric and the third metric; selecting N SPS AN resources from the set of SPS AN resources to potentially configure for a new SPS-configured UE based at least on the value of the fourth metric; and selecting one of the N SPS AN resources of the N SPS AN resources based at least on the value of the fourth metric when the UE is activated for SPS operation.

In another aspect thereof the exemplary embodiments of this invention provide an apparatus that comprises at least one data processor and at least one memory including computer program code. The at least one memory and computer program code are configured, with the at least one data processor, to cause the apparatus at least to determine a set of semi-persistent scheduling acknowledge/negative acknowledge (SPS AN) resources, to configure as a first metric for each member of the set of SPS AN resources a count of a number of user equipments (UEs) for which the SPS AN resource has been configured but for which SPS is not activated; to configure as a second metric for each member of the set of SPS AN resources a count of a number of sub-frames in which the SPS AN resource has been activated for a UE; to configure as a third metric for each member of the set of SPS AN resources a count of a number of UEs for which the particular SPS AN resource is configured but some other SPS AN resource is allocated during SPS activation; to form a fourth metric for each member of the set of SPS AN resources as a combination of the first metric, the second metric and third metric; and to select N SPS AN resources from the set of SPS AN resources to potentially configure for a new SPS-configured UE based at least on the value of the fourth metric, and to select one of the N SPS AN resources of the N SPS AN resources based at least on the value of the fourth metric when the UE is activated for SPS operation.

In yet another aspect thereof the exemplary embodiments of this invention provide a data structure embodied in a non-transitory computer-readable medium that is coupled with a resource scheduler of a wireless communications network. The data structure is readable and writable by the resource scheduler and comprises a number of rows equal to a number of PUCCH AN resources allocated for SPS and four columns defining: (1) a PUCCH resource index; (2) a # of sub-frames in which the resource is not available because it has already been activated for a user equipment (UE) in those subframes; (3) a # of UEs for which the resource has been configured, but SPS is not activated; (4) a # of UEs for which the resource has been configured, but some other SPS AN resource is allocated as part of SPS activation and (5) a combinations of the values found in columns (2), (3) and (4).

In yet another aspect thereof the exemplary embodiments of this invention provide an apparatus that comprises means for determining a set of semi-persistent scheduling acknowledge/negative acknowledge (SPS AN) resources; means for configuring as a first metric for each member of the set of SPS AN resources a count of a number of user equipments (UEs) for which the SPS AN resource has been configured but for which SPS is not activated, for configuring as a second metric for each member of the set of SPS AN resources a count of a number of sub-frames in which the SPS AN resource has been activated for a UE, for configuring as a third metric for each member of the set of SPS AN resources a count of a number of UEs for which the particular SPS AN resource is configured but some other SPS AN resource is allocated during SPS activation and for forming a fourth metric for each member of the set of SPS AN resources as a combination of the first metric, the second metric and the third metric; means for selecting N SPS AN resources from the set of SPS AN resources to potentially configure for a new SPS-configured UE based at least on the value of the fourth metric; and means for selecting one of the N SPS AN resources of the N SPS AN resources based at least on the value of the fourth metric when the UE is activated for SPS operation.

In these embodiments, including the data structure embodiment, the data structure is readable by the resource scheduler to initially select for a user equipment (UE) a set of N PUCCH resources from PUCCH AN resources allocated for SPS, where the set of N PUCCH resources are those that are selected in consideration of the first three metrics as indicated by having the smallest values in the fifth (5) column. The data structure is further readable by the resource scheduler to determine which one of the N PUCCH AN resources to activate at the time of SPS activation for the UE as being the PUCCH AN resource of the N PUCCH AN resources that are selected in consideration of the first three metrics as indicated by having the smallest value in the fifth (5) column.

In these various embodiments N may be equal to four, and the combination of the values may be a weighted sum, such as the weighted sum of the values found in columns (2), (3) and (4) and that is stored in the fifth (5) column of the data structure embodiment.

BRIEF DESCRIPTION OF THE DRAWINGS

In the attached Drawing Figures:

FIG. 4 depicts one non-limiting example of a Table that is formed, updated and used in accordance with examples of the embodiments of this invention, where the Table has four columns: (1) PUCCH resource index; (2) # of sub-frames in which the PUCCH resource is not available because it has already been activated for a UE; (3) # of UEs for which the PUCCH resource has been configured, but SPS is not activated; (4) a # of UEs for which the resource has been configured, but some other SPS AN resource is allocated as part of SPS activation; and (5) a combination, such as a Weighted sum, of the values found in columns (2), (3) and (4). The combination metric need not always be a weighted sum.

DETAILED DESCRIPTION

One modern communication system is known as evolved UTRAN (E-UTRAN, also referred to as UTRAN-LTE or as E-UTRA). In this system the DL access technique is OFDMA, and the UL access technique is SC-FDMA.

One specification of interest is 3GPP TS 36.300 V11.0.0 (2011-12) *Technical Specification* 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), referred to for simplicity hereafter as 3GPP TS 36.300.

Figure 1A:
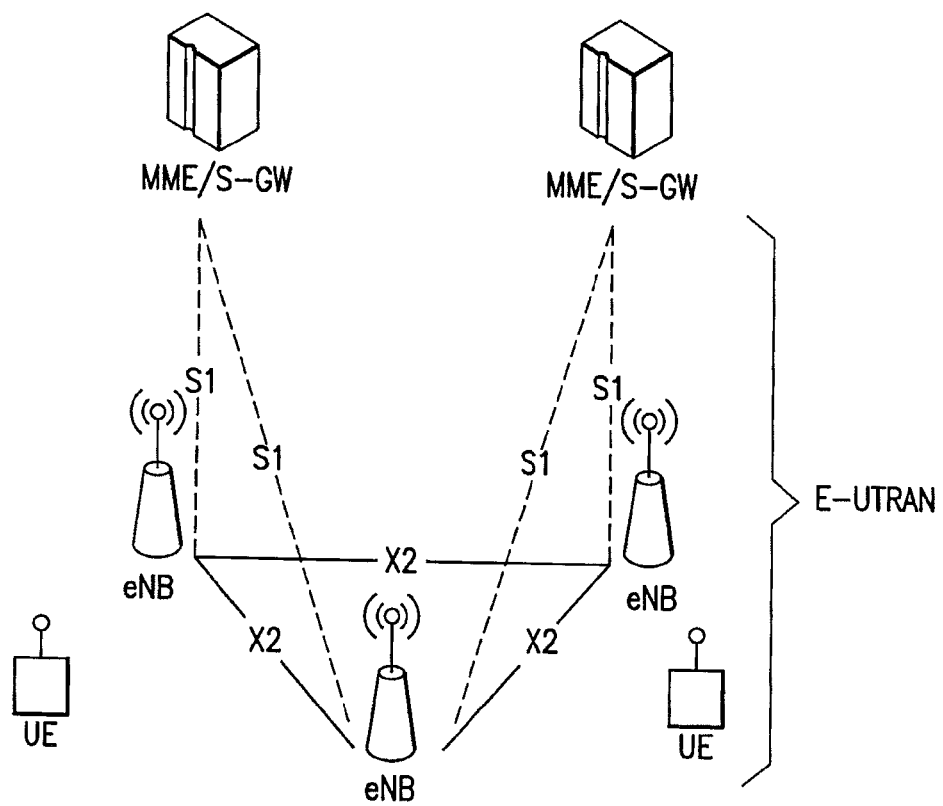
FIG. 1A is based on FIG. 4.1 of 3GPP TS 36.300, and shows the overall architecture of the E-UTRAN system.

FIG. 1A is based on FIG. 4.1 of 3GPP TS 36.300 and shows the overall architecture of the E-UTRAN system. The E-UTRAN system includes network access nodes or eNBs, providing the E-UTRAN user plane and control plane (radio resource control (RRC)) protocol terminations towards UEs. The eNBs are interconnected with each other by means of an X2 interface. The eNBs are also connected by means of an S1 interface to an evolved packet core (EPC), and more specifically to a mobility management entity (MME) and to a serving gateway (S-GW) by means of an S1 MME interface. The S1 interface supports a many-to-many relationship between MMEs, S-GWs and eNBs.

Figure 1B:
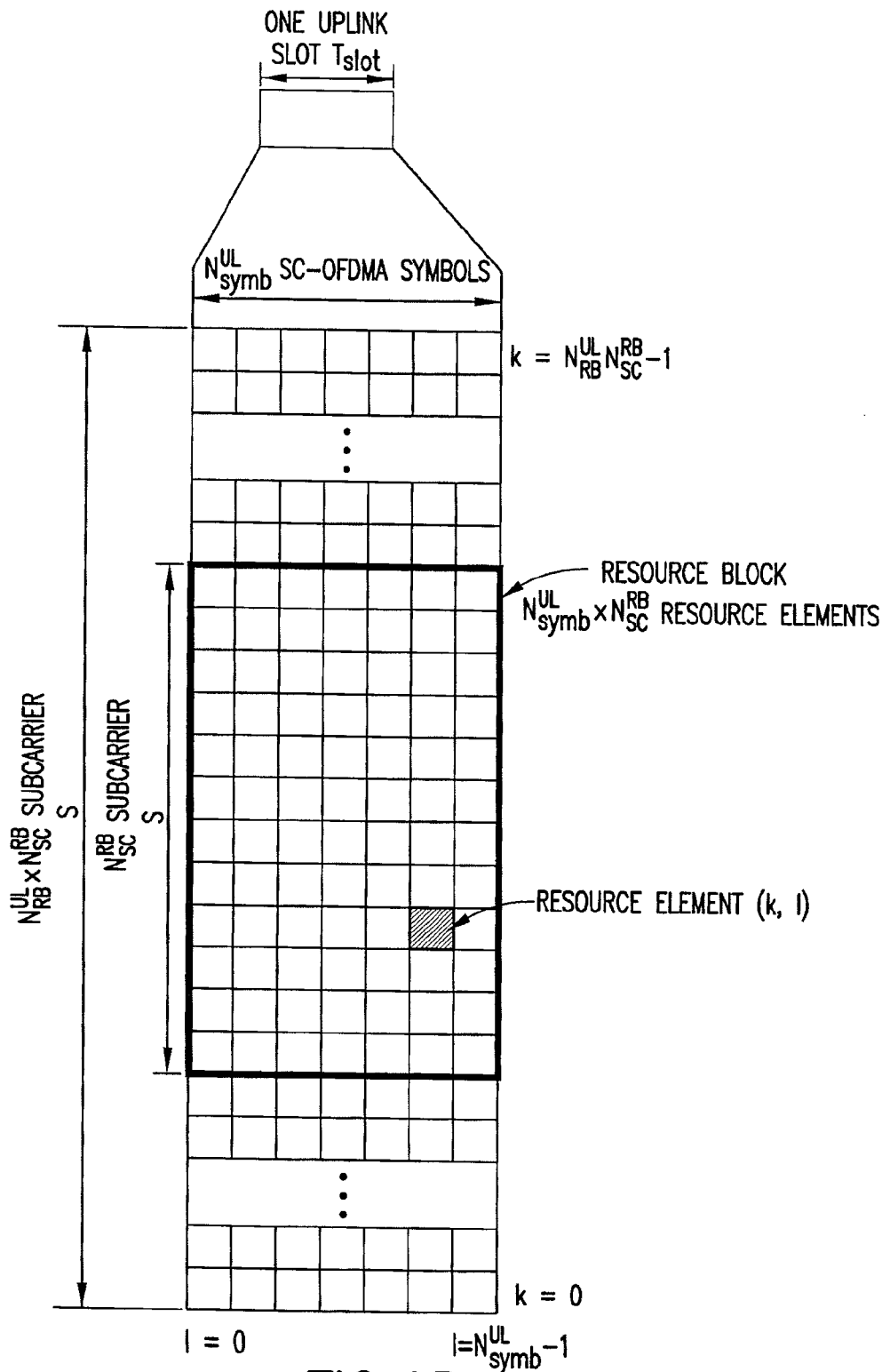
FIG. 1B reproduces FIG. 5.2.1-1: Uplink resource grid, of 3GPP TS 36.211 and shows the relationship of SC-FDMA symbols, subcarriers, resource blocks and resource elements.
Figure 1C:
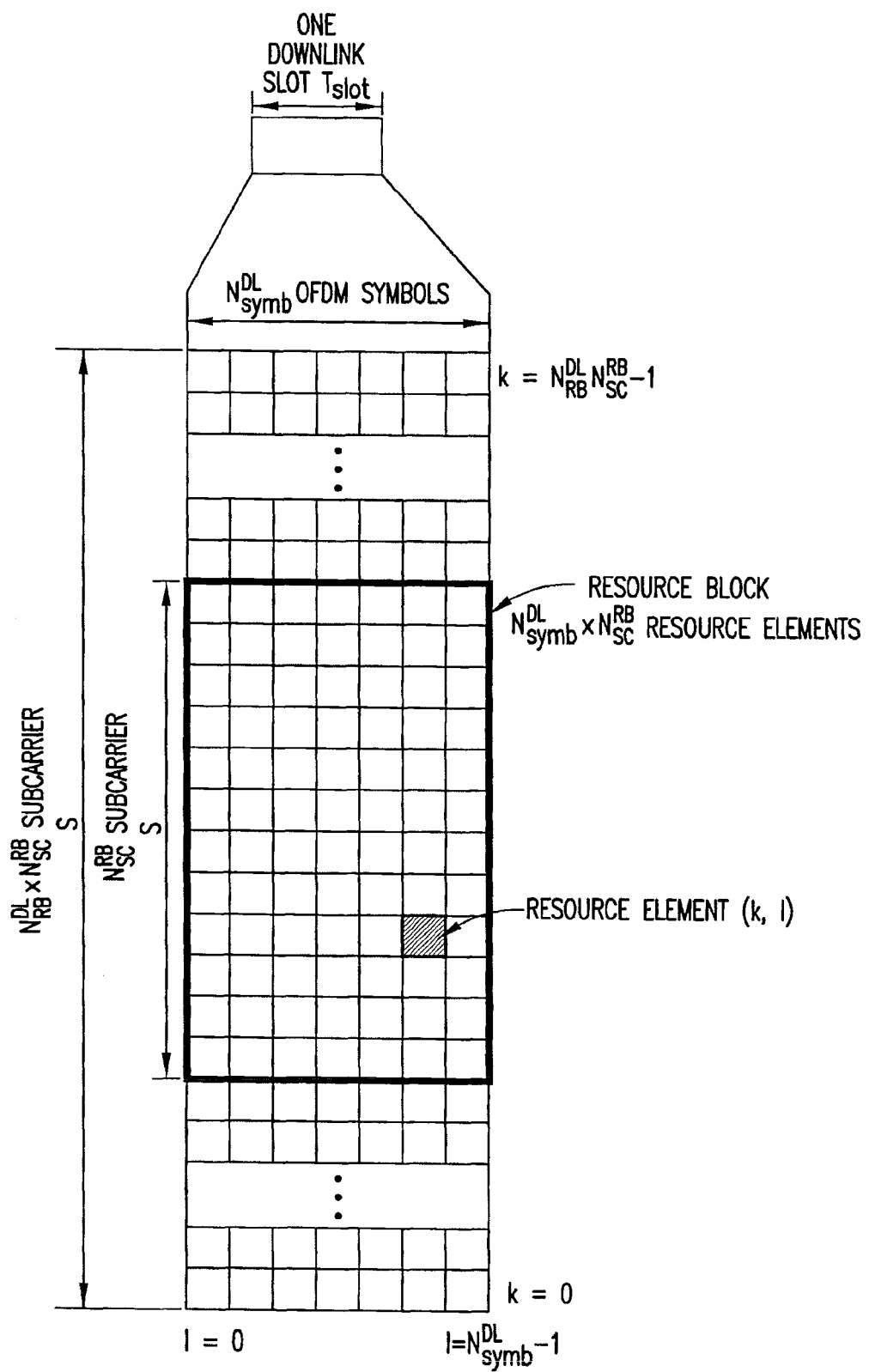
FIG. 1C reproduces FIG. 6.2.2-1: Downlink resource grid, of 3GPP TS 36.211 and shows the relationship of OFDM symbols, subcarriers, resource blocks and resource elements.

Uplink and downlink frames (of 10 msec duration) are defined in 3GPP TS 36.211 V 10.4.0 (2011-12) *Technical Specification* 3rd Generation Partnership Project; Technical Specification Group Radio Access Network; Evolved Universal Terrestrial Radio Access (E-UTRA); Physical Channels and Modulation (Release 10). FIG. 1B reproduces FIG. 5.2.1-1: Uplink resource grid, of 3GPP TS 36.211 and shows the relationship of SC-FDMA symbols, subcarriers, resource blocks and resource elements. FIG. 1C reproduces FIG. 6.2.2-1: Downlink resource grid, of 3GPP TS 36.211 and shows the relationship of OFDM symbols, subcarriers, resource blocks and resource elements.

Also of interest herein are further releases of 3GPP LTE targeted towards future IMT-A systems, referred to herein for convenience simply as long term evolution (LTE)-Advanced (LTE-A). A goal of LTE-A is to provide significantly enhanced services by means of higher data rates and lower latency with reduced cost, while maintaining backwards compatibility with earlier releases of LTE.

3GPP TS 36.213 V10.4.0 (2011-12) *Technical Specification $3^{rd}$ Generation Partnership Project; Technical Specification Group Radio Access Network; Evolved Universal Terrestrial Radio Access (E-UTRA); Physical layer procedures* (Release 10), in Section 7.3, defines the UE procedure for reporting HARQ-ACK. Also of interest is Section 9.2 PDCCH validation for semi-persistent scheduling. As is stated in Section 9.2, the UE shall validate a Semi-Persistent Scheduling assignment PDCCH only if all the following conditions are met:

the CRC parity bits obtained for the PDCCH payload are scrambled with the Semi-Persistent Scheduling C-RNTI;

the new data indicator field is set to '0'. In case of DCI formats 2, 2A, 2B and 2C, the new data indicator field refers to the one for the enabled transport block.

Validation is achieved if all the fields for the respective used DCI format are set according to Table 9.2-1 or Table 9.2-1A.

If validation is achieved, the UE shall consider the received DCI information accordingly as a valid semi-persistent activation or release.

If validation is not achieved, the received DCI format shall be considered by the UE as having been received with a non-matching CRC.

TABLE 9.2-1

Special fields for Semi-Persistent Scheduling
Activation PDCCH Validation

| | DCI format 0 | DCI format 1/1A | DCI format 2/2A/2B/2C |
|---|---|---|---|
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

TABLE 9.2-1A

Special fields for Semi-Persistent
Scheduling Release PDCCH Validation

| | DCI format 0 | DCI format 1A |
|---|---|---|
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

For the case that the DCI format indicates a semi-persistent downlink scheduling activation, the TPC command for PUCCH field shall be used as an index to one of the four PUCCH resource values configured by higher layers, with the mapping defined in Table 9.2-2

TABLE 9.2-2

PUCCH Resource value for Downlink Semi-Persistent Scheduling

| Value of 'TPC command for PUCCH' | $n_{PUCCH}^{(1,p)}$ |
|---|---|
| '00' | The first PUCCH resource value configured by the higher layers |
| '01' | The second PUCCH resource value configured by the higher layers |
| '10' | The third PUCCH resource value configured by the higher layers |
| '11' | The fourth PUCCH resource value configured by the higher layers |

Also of interest herein is 3GPP TS 36.331 V 10.4.0 (2011-12) *Technical Specification* 3rd Generation Partnership Project; Technical Specification Group Radio Access Network; Evolved Universal Terrestrial Radio Access (E-UTRA); Radio Resource Control (RRC); Protocol specification (Release 10). This document defines an SPS-Configuration information element (IE).

When dynamic scheduling is used the UE determines the PUCCH AN resource using a first control channel element (CCE) of a DL PDCCH message. However, with SPS there is no DL PDCCH message and thus the UE is assigned a semi-static PUCCH resource. In practice the RRC layer configures four PUCCH resources as part of an SPS-config N1-PUCCH-AN-PersistentList. At the time of SPS activation using the PDCCH, one of the four configured resources is selected and conveyed to the UE as part of transmit power control (TPC) bits in a DL PDCCH assignment message. The TPC bits are over-loaded with this functionality for the PDCCH activation message. The broadcast parameter n1PUCCH-AN gives the starting point of dynamic AN resources. Since the SPS AN resources occur to the left of this value, the configuration of n1PUCCH-AN should take this into account As will be described in detail below, an aspect of the examples of this invention addresses and solves a problem of how to set the value of the SPS-config N1-PUCCH-AN-PersistentList, and the value in the TPC bits in the PDCCH SPS activation message, such that: the probability is minimized of not having any of the configured PUCCH resources being available in a sub-frame in which SPS is configured, the total number of PUCCH resources set aside for SPS AN is minimized, and maximum flexibility in terms of allowing the SPS to be configured in any sub-frame may be achieved.

Figure 2:
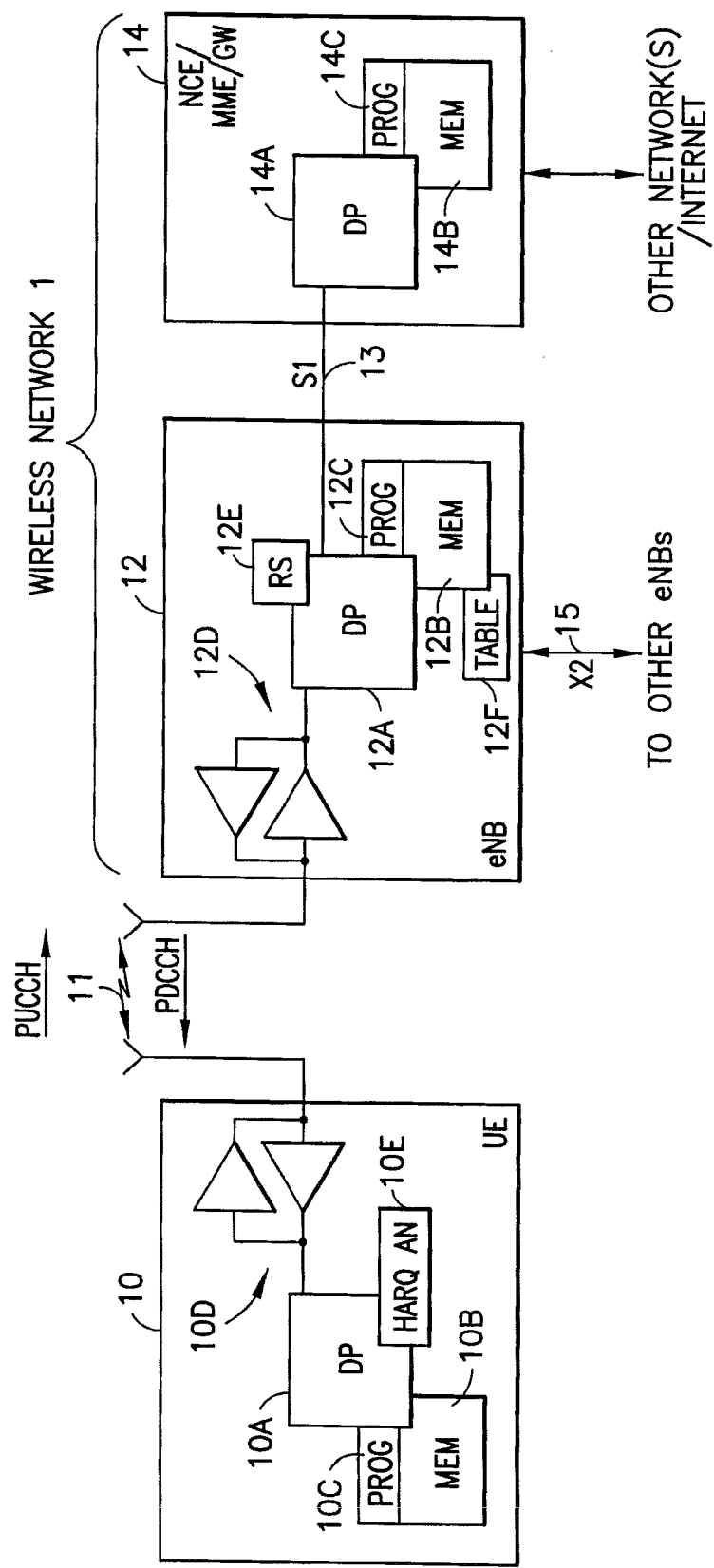
FIG. 2 shows a simplified block diagram of various electronic devices that are suitable for use in practicing the exemplary embodiments of this invention.

Before describing in further detail the exemplary embodiments of this invention, reference is made to FIG. 2 for illustrating a simplified block diagram of various electronic devices and apparatus that are suitable for use in practicing the exemplary embodiments of this invention. In FIG. 2 a wireless network 1 is adapted for communication over a wireless link 11 with an apparatus, such as a mobile communication device or node which may be referred to as a UE 10, via a network access node, such as a Node B (base station), and more specifically an eNB 12. The network 1 may include a network control element (NCE) 14 that may include the MME/S-GW functionality shown in FIG. 1A, and which provides connectivity with a further network, such as a telephone network and/or a data communications network (e.g., the internet).

The UE 10 includes a controller, such as at least one computer or a data processor (DP) 10A, at least one non-transitory computer-readable memory medium embodied as a memory (MEM) 10B that stores a program of computer instructions (PROG) 10C, and at least one suitable radio frequency (RF) transmitter and receiver pair (transceiver) 10D for bidirectional wireless communications with the eNB 12 via one or more antennas.

The eNB 12 also includes a controller, such as at least one computer or a data processor (DP) 12A, at least one computer-readable memory medium embodied as a memory (MEM) 12B that stores a program of computer instructions (PROG) 12C, and at least one suitable RF transceiver 12D for communication with the UE 10 via one or more antennas (typically several when multiple input/multiple output (MIMO) operation is in use). The eNB 12 is coupled via a data/control path 13 to the NCE 14. The path 13 may be implemented as the S1 interface shown in FIG. 1A. The eNB 12 may also be coupled to another eNB via data/control path 15, which may be implemented as the X2 interface shown in FIG. 1A.

For the purposes of describing the exemplary embodiments of this invention the UE 10 may be assumed to also include a HARQ AN reporting function 10E that is operable with SPS PUCCH resource signaling from the eNB 12. The eNB 12 may include a resource scheduler (RS) 12E that operates in conjunction with a Table 12F as shown in FIG. 4 (first non-limiting embodiment) and described in detail below. The Table 12F may be stored in the memory 12B, and may be considered to represent a data structure that is stored in a non-transitory computer-readable medium. The embodiment of the Table 12F of FIG. 4 may be assumed to be a presently preferred embodiment. Note that in another (un-illustrated) embodiment a Table with four columns could be used, such as by setting the weights of the fourth column of FIG. 4 to zero. Thus, it should be clear that the invention is not limited for use with just one assemblage and arrangement of data. Further, and by example, in Table 12F the columns may be arranged in a different order than shown.

At least the program 12C may be assumed to include program instructions that, when executed by the associated data processor 12A, enable the device to operate in accordance with the embodiments of this invention, as will be discussed below in greater detail. In general, the embodiments of this invention may be implemented at least in part by computer software executable by the DP 10A of the UE 10 and/or by the DP 12A of the eNB 12, or by hardware, or by a combination of software and hardware (and firmware).

The various data processors, memories, programs, transceivers and interfaces depicted in FIG. 2 can all be considered to represent means for performing operations and functions that implement the several non-limiting aspects and embodiments of this invention.

In general, the various embodiments of the UE 10 can include, but are not limited to, cellular mobile devices, smartphones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer-readable memories 10B and 12B may be of any type suitable to the local technical environment and may be implemented using any suitable data storage technology, such as semiconductor based memory devices, random access memory, read only memory, programmable read only memory, flash memory, magnetic memory devices and systems, optical memory devices and systems, fixed memory and removable memory. The data processors 10A and 12A may be of any type suitable to the local technical environment, and may include one or more of general purpose computers, special purpose computers, microprocessors, digital signal processors (DSPs) and processors based on multi-core processor architectures, as non-limiting examples.

Figure 3:
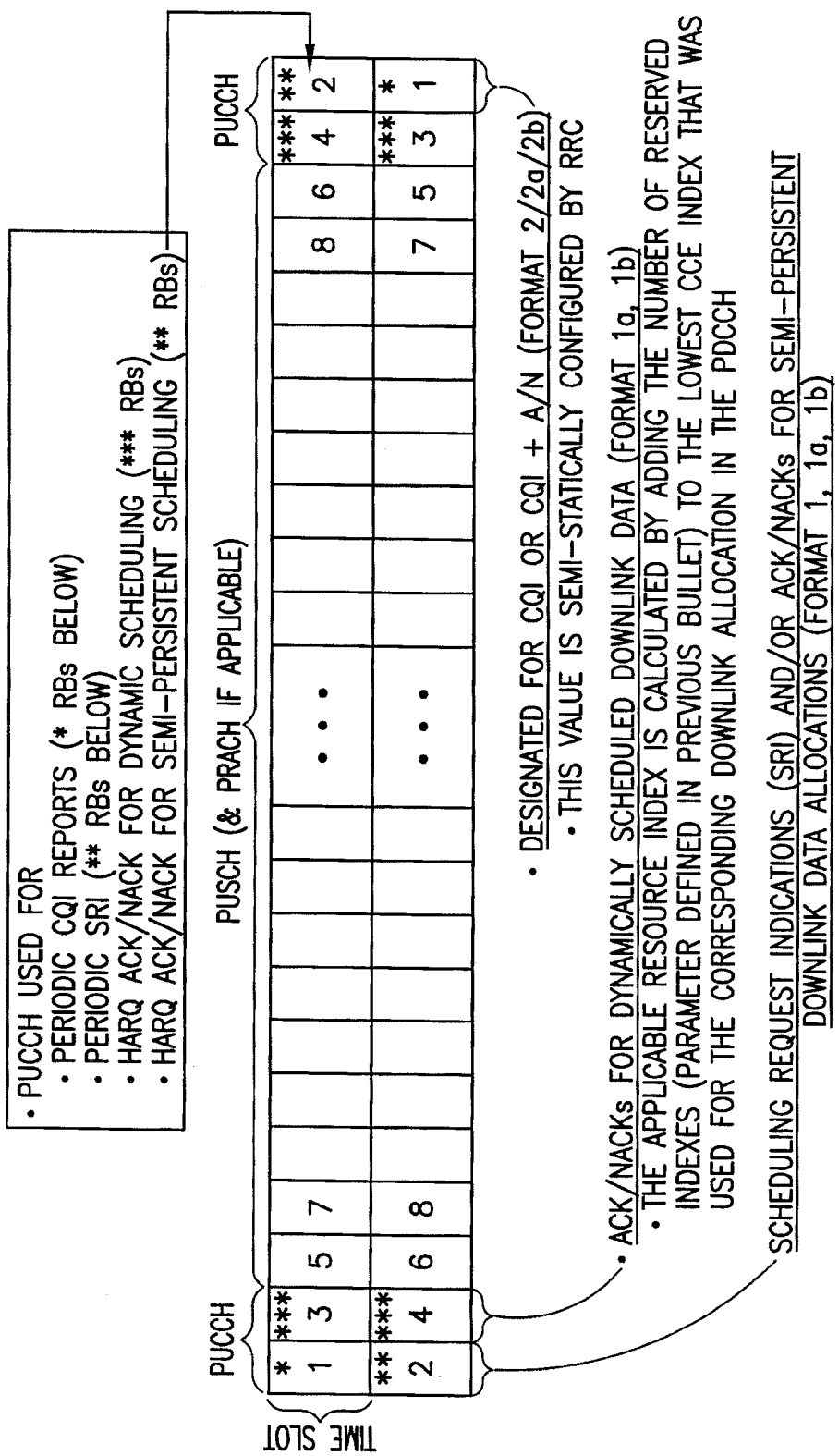
FIG. 3 shows an example of PUCCH allocations.

FIG. 3 shows an example of PUCCH allocations. The PUCCH used for periodic channel quality indicator (CQI) reports, periodic scheduling request indications (SRI), hybrid automatic repeat request (HARQ) ACK/NACK for dynamic scheduling, and for HARQ ACK/NACK for semi-persistent scheduling (SPS). A clear need exists as to best manage how PUCCH resources are allocated for HARQ ACK/NACK for SPS.

Discussed now in accordance with an aspect of this invention is a configuration of n1PUCCH-AN (ACK/NACK).

The exact number of resources needed for SPS AN can fluctuate across sub-frames and over time. One may dimension the SPS AN resources for peak VoLTE (voice over LTE) load. For example, assume that if it is expected to support up to 400 UEs, the average number of SPS UEs per sub-frame may be 400 UEs/20 sub-frames=20. To account for some fluctuations (imbalance in the number of SPS UEs/sub-frame) a tunable parameter can be added, such as DB:% PucchHeadroomForSps. Thus, it is possible to provision the PUCCH for:

(1+% PucchHeadroomForSps/100)*(# supported UEs/20) SPS AN resources per sub-frame.

In general, SPS imposes additional load on the PUCCH because the PUCCH resources have to be dimensioned for a worst-case scenario for both SPS and dynamic scheduling.

Discussed now further in accordance with an aspect of this invention is a configuration of an N1-PUCCH-AN-PersistentList.

When the RRC layer configures this parameter, the exact sub-frame in which the SPS will be activated for a given UE 10, if at all, is not known. As a result the RRC configures four different resource values. The SPS cannot be activated on a given sub-frame if none of the four configured PUCCH resource values are available and, thus, the four values configured by the RRC layer should be judiciously chosen. Clearly, if a given PUCCH resource is used in all 20 sub-frame offsets, then it should not be configured. In general, the larger the number of sub-frames in which the PUCCH resource is still available, the better the resource is. In addition, the fewer the number of UEs 10 for which this PUCCH resource has been configured, but for which SPS activation has not yet been accomplished, the better the resource is.

These observations lead to the following algorithm.

Form the Table 12F as shown in FIG. 4 (as was noted above, the Table 12F may be considered to be a data structure stored in the memory 12B of the eNB 12). The Table 12F has a number of rows equal to a number of PUCCH AN resources allocated for SPS and five columns defining:

(1) a PUCCH resource index;

(2) a # of sub-frames in which the resource is not available because it has already been activated for a UE in those sub-frames;

(3) a # of UEs for which the resource has been configured, but SPS is not activated;

(4) a # of UEs for which the resource has been configured, but SPS is activated using a different SPS AN resource; and (5) a Weighted sum of columns (2) (3) and (4), or more generally some combination of the values found in columns (2), (3) and (4). In the fifth column the weights (if used) applied to columns (2), (3), and (4) are designated w1, w2 and w3, respectively.

Note that the weights can be different for each column or they may be the same. The weights may be fixed or variable. A special case is presented when all three weights w1, w2 and w3 are set equal to one, in which case the weighted sum in the fifth column gives a total number of UEs for which the associated SPS AN resource is configured.

For each potential PUCCH resource that can be used as an SPS AN resource, the algorithm keeps track of:

the number (#) of sub-frames in which the PUCCH resource is not available because it has already been activated for a UE in those subframes;

the number (#) of UEs for which this PUCCH resource has been configured, but for which SPS has not yet been activated; and the number (#) of UEs for which this PUCCH resource has been configured, but for which SPS is activated using a different SPS AN resource.

Only those PUCCH resources that are available in at least one sub-frame offset appear in the Table 12F.

A combination, e.g., a weighted sum of the three metrics in columns (2), (3) and (4), is used as a metric to decide which resources to configure for a new SPS UE 10. The four entries that are configured for the new SPS UE 10 are the four PUCCH resources from the Table 12F having the smallest value of either the weighted sum metric or any other combination of the metrics in column (5).

It should be noted with regard to the Table 12F of FIG. 4 that other procedures that appropriately combine the three individual metrics of columns (2), (3) and (4) can also be used. As two non-limiting examples, a product of these three metrics can be used, or a weighted sum or product of the three metrics raised to different powers can be used.

After the various entries of the Table 12F of FIG. 4 are configured and formed the Table 12F needs to be updated during operation. For example, once a PUCCH resource is configured for the new UE 10 the third column (# UEs . . . ) is incremented by one for the corresponding resource. If an SPS allocation for a UE 10 is activated, then the value in the third column is decremented by one for the four PUCCH resources, and the value in column 2 for the activated PUCCH resource is incremented by one. Also the values in column 4 are incremented by one for the three of the four PUCCH resources that are not allocated as part of the SPS activation. If an SPS allocation for a UE 10 is deactivated, but not yet deconfigured, the corresponding entry in the second column is decremented by one, but that entry and the entries for the three other configured resources are each incremented by one in the third column. Also the values in column 4 are decremented by one for the three of the four PUCCH resources that were not allocated as part of the SPS activation If an SPS allocation for a UE 10 is deconfigured (assuming the SPS is currently deactivated), then the value in column 3 is decremented by one for each of the four PUCCH resources allocated for that particular UE 10.

However, other variants are possible, and the metric may be expanded to consider the following two exemplary considerations.

(a) Each subsequent PUCCH resource can be selected so that it maximizes (considers) the number of sub-frames in which there is some resource among the configured ones available. For example, the second resource can attempt to maximize the number of sub-frames in which it is available among the sub-frames in which the first resource is not available.

(b) A smaller window of sub-frames (as opposed to the entire 20 ms) can be considered over which the metrics are maximized. This smaller window of sub-frames may in practice be nearer in time to the actual arrival of a VoIP (VoLTE) packet (after accounting for some jitter).

Of the four PUCCH resources configured using the RRC layer, and if more than one of the four PUCCH resources is free in any given sub-frame at the time of SPS activation, then the question becomes which of the four PUCCH resources should be activated. Following the logic described above, the PUCCH resource may be activated that has the smallest value of either the weighted sum metric, or any other combination of the metrics, among those PUCCH resources that are available for that sub-frame.

In one aspect thereof the embodiments of this invention enable a configuration of a number of SPS AN resources based on an expected number of VoIP UEs 10, and provide a configurable parameter for a network operator to trade-off between blocking a UE 10, due to unavailability of SPS AN resources, and an increase in PUCCH overhead. This may be based at least in part on an estimate of the number of SPS UEs 10 whose activation may occur in a given sub-frame.

In another aspect thereof the embodiments of this invention enable a configuration of SPS AN resources for a given UE 10 so that the blocking probability is minimized based on the number of UEs already configured with that SPS AN resource, and the number of UEs 10 whose SPS has been activated on that SPS AN resource. Additional considerations may include an ability to maximize the number of sub-frames where at least some SPS AN resource is free.

When SPS is activated, activating that SPS AN resource that has been configured for the least number of UEs 10 beneficially reduces the probability of blocking of a subsequent UE.

The benefits, advantages and technical effects made possible by the use of these exemplary embodiments may include at least the following:

a) the probability is minimized of not having any of the previously configured PUCCH SPS resources available in the sub-frame in which SPS is configured for a particular UE 10;

b) a total number of PUCCH resources set aside for SPS AN can be minimized; and c) maximum flexibility is provided in terms of allowing the SPS to be configured in any sub-frame.

The embodiments of this invention take into account the number of sub-frames in which a PUCCH SPS resource is available and the number of UEs 10 for which a particular resource has already been configured when deciding the resource to configure for a new UE 10. The embodiments of this invention provide full flexibility to configure the SPS resources at any point in time, for every new UE, or only for UEs that have, for example, a VoLTE bearer setup, or only at the time of SPS activation.

The exemplary embodiments provide in one aspect thereof a method to determine a number of SPS PUCCH AN resources to reserve. The method includes making an initial estimate based on an assumption that a load of SPS UEs will be equally spread across all sub-frames, and allowing for additional headroom to account for any non-uniform loading across sub-frames. The method further determines a set of N SPS AN resources to configure for a new SPS-configured UE, comprising configuring as a first metric a count of a number of UEs for which a given resource has been configured but for which SPS is not activated; configuring as a second metric a count of a number of sub-frames in which a given resource has been activated for a UE; configuring a third metric as a count of a number of UEs for which a given resource has been configured but for which SPS is activated by allocating a different AN resource (out of the four different configured PUCCH AN resources for the UE); forming a fourth metric as a combination of the first second and third metrics; and selecting one of the N SPS AN resources having a smallest value of the fourth metric.

The exemplary embodiments of this invention pertain at least in part to PUCCH resource allocations for SPS AN transmissions. In accordance with the exemplary embodiments the PUCCH AN resource assignment for DL SPS UEs occurs in two steps. In a first step, RRC configures on a UE-specific basis four resource indices (which determine the PRB index, the cyclic shift within the PRB and the orthogonal cover, but does not determine the sub-frame offset) as part of the information element (IE) SPS-Config. The specific RRC parameter that performs this configuration is referred to as N1-PUCCH-AN-PersistentList in 3GPP TS 36.331. In the second step, when the scheduler activates the DL SPS by sending the PDCCH activation message with the fields set according to 3GPP TS 36.213, Section 9.2 (reproduced above), the eNB scheduler 12E chooses one of the four configured SPS resources and conveys it to the UE 10. The two bits that convey this information are the TPC bits, which are not used for power control purposes in the SPS activation message.

The scheduler 12E keeps a separate pool of resources for SPS AN. The number of PUCCH AN resources for SPS UEs are provisioned such that it can accommodate (1+% Pucch-HeadroomForSps/100)*(# supported UEs/20) per subframe for the chosen value of the RRC parameter ☐PUCCH-Shift, where the factor of 20 in the denominator is due to the 20 ms allocation period for SPS. The parameter % PucchHeadroomForSps is the headroom on the average number of active Semi-Persistent Scheduling (SPS) UEs 10 per sub-frame at full load, where all the connected UEs 10 are assumed to be SPS UEs. This scaled number is then the number of PUCCH AN resources reserved for SPS UEs in each sub-frame.

To reiterate, when requested by L3 control block for SPS AN resources to configure for a new SPS UE, the scheduler 12E chooses and conveys those four resources that have been configured the least number of existing SPS UEs 10. Note that not all resource indices can be allocated, i.e., only those resources that conform to DB:☐PucchShift are allocable. Once the four resources have been configured, the count of the number of UEs 10 using the four resources should be incremented by one. Similarly, when a UE 10 configured with SPS resources either leaves the cell or moves to RRC_IDLE, or when the SPS resources are de-configured, the count of the number of UEs that have been configured or activated for particular SPS AN resources should be appropriately updated (decremented by one).

At the time of DL SPS activation, if none of the four configured resources are available for use in that sub-frame, SPS cannot be activated for that UE 10 in that sub-frame. If more than one of the configured resources are available in that sub-frame, the scheduler 12E may activate that SPS resource that has been configured for the least number of UEs.

Based on the foregoing it should be apparent that the exemplary embodiments of this invention provide a method, apparatus and computer program(s) to enhance the operation of SPS UEs in a wireless network by reducing the probability of not having any of the configured PUCCH resources available in a sub-frame in which SPS is configured by reducing the total number of PUCCH resources set aside for SPS AN, and by providing maximum flexibility in terms of allowing the SPS to be configured in any sub-frame.

The exemplary embodiments provide, when determining a PUCCH AN resource to configure for a new SPS UE, a consideration of the number of sub-frames in which a particular PUCCH AN resource is available, the number of UEs for which the particular PUCCH AN resource has already been configured but SPS is not activated, and the number of UEs for which the particular PUCCH AN resource is configured but some other PUCCH AN resource (out of the four configured PUCCH AN resources for the UE) is allocated during SPS activation. The embodiments of this invention provide full flexibility to configure the SPS resources at any point in time, for every new UE, or only for UEs that have a VoLTE bearer setup, or only at the time of SPS activation.

Figure 5:
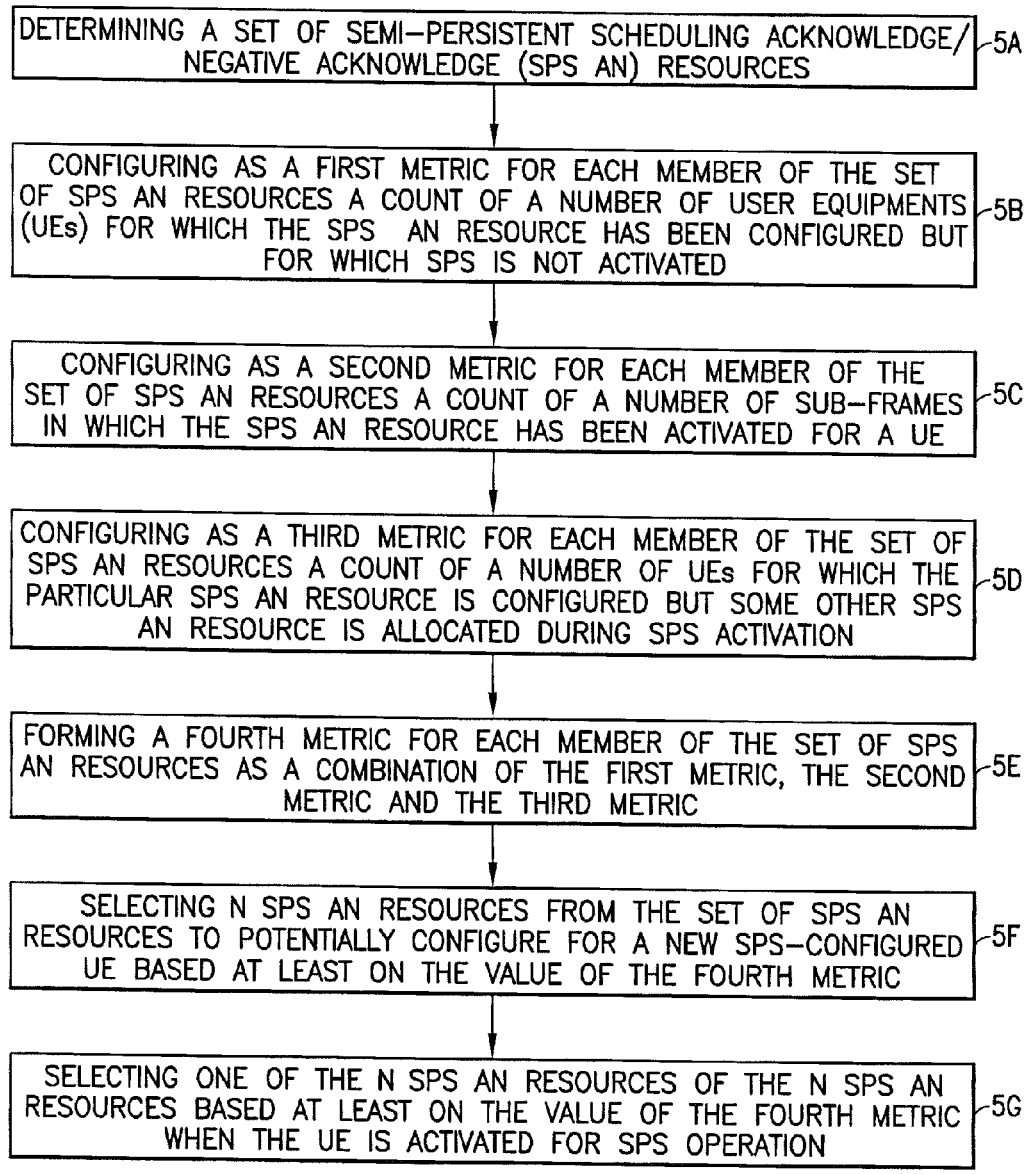
FIG. 5 is a logic flow diagram that illustrates the operation of a method, and a result of execution of computer program instructions embodied on a computer readable medium, in accordance with the exemplary embodiments of this invention.

FIG. 5 is a logic flow diagram that illustrates the operation of a method, and a result of execution of computer program instructions, in accordance with the exemplary embodiments of this invention. In accordance with these exemplary embodiments a method performs, at Block 5A, a step of determining a set of semi-persistent scheduling acknowledge/negative acknowledge (SPS AN) resources. At Block 5B there is a step of configuring as a first metric for each member of the set of SPS AN resources a count of a number of user equipments (UEs) for which the SPS AN resource has been configured but for which SPS is not activated. At Block 5C there is a step of configuring as a second metric for each member of the set of SPS AN resources a count of a number of sub-frames in which the SPS AN resource has been activated for a UE. At Block 5D there is a step of configuring as a third metric for each member of the set of SPS AN resources a count of a number of UEs for which the particular SPS AN resource is configured but some other SPS AN resource is allocated during SPS activation. At Block 5E there is a step of forming a fourth metric for each member of the set of SPS AN resources as a combination of the first metric, the second metric and the third metric. At Block 5F there is a step of selecting N SPS AN resources from the set SPS AN resources to potentially configure for a new SPS-configured UE based at least on the value of the fourth metric. At Block 5G there is a step of selecting one of the N SPS AN resources of the N SPS AN resources based at least on the value of the fourth metric when the UE is activated for SPS operation.

In the as shown in FIG. 5, where N is equal to four.

In the as shown in FIG. 5, where forming the fourth metric as the combination of the first, second and third metrics comprises forming a weighted sum of the first metric, the second metric and the third metric.

In the as shown in FIG. 5, where selecting one of the N SPS AN resources based at least on the value of the fourth metric selects the one of N SPS AN resources having a smallest value of the fourth metric.

In the as shown in FIG. 5, further comprising determining the set of SPS AN resources such that a number of sub-frames in which SPS can be activated is maximized.

In the as shown in FIG. 5, and further comprising determining which one of the N SPS AN resources to activate at the time of SPS activation for the UE based on a data structure having a plurality of entries corresponding to a plurality of SPS AN resources, each entry further comprising the first metric, the second metric, the third metric and the fourth metric associated with the corresponding SPS AN resource, where the resource that is determined to be activated for the UE is one of the N resources that is selected in consideration of the first metric, the second metric and the third metric as indicated by having the smallest value of the fourth metric.

In the as shown in FIG. 5 and as described in preceding paragraph, where the step of selecting the N SPS AN resources from the set of SPS AN resources is performed based on the data structure, where the N SPS AN resources that are selected for the UE are based on a consideration of the first metric, the second metric and the third metric as indicated by having the smallest values of the fourth metric.

In the as shown in FIG. 5, comprising a preliminary step of determining a number of SPS AN resources to reserve in a set of physical uplink control channel (PUCCH) resources by making an estimate based on an assumption that a load of SPS UEs will be equally spread across all sub-frames, and allowing for additional headroom to account for any non-uniform loading across sub-frames.

In the as shown in FIG. 5, where the SPS AN resources are physical uplink control channel (PUCCH) resources.

In the as shown in FIG. 5, performed at least partially by a resource scheduler function located at an evolved NodeB.

The various blocks shown in FIG. 5 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the E-UTRAN (LTE-A) system, it should be appreciated that the exemplary embodiments of this invention are not limited for use with only this one particular type of wireless communication system, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters (e.g., "# sub-frames . . . ", "# UEs . . . ", "weighted sum . . . ", "% PucchHeadroomForSps", etc.) are not intended to be limiting in any respect, as these parameters may be identified by any suitable names. Further, the formulas and expressions that use these various parameters may differ from those expressly disclosed herein. Further, the various names assigned to different channels (e.g., PUCCH, PDCCH, etc.) and information elements (e.g., SPS-Config, TPC, etc.) are not intended to be limiting in any respect, as these various channels and information elements may be identified by any suitable names. Further, and as was stated above, the exact form and information content of the Table used by the resource scheduler 12E may vary from what is shown in FIG. 4, which should be viewed as being merely exemplary.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
   determining a set of semi-persistent scheduling acknowledge/negative acknowledge resources;
   configuring as a first metric for each member of the set of semi-persistent scheduling acknowledge/negative acknowledge resources a count of a number of user equipments for which the semi-persistent scheduling acknowledge/negative acknowledge resource has been configured but for which semi-persistent scheduling is not activated;
   configuring as a second metric for each member of the set of semi-persistent scheduling acknowledge/negative acknowledge resources a count of a number of sub-frames in which the semi-persistent scheduling acknowledge/negative acknowledge resource has been activated for a user equipment;
   configuring as a third metric for each member of the set of semi-persistent scheduling acknowledge/negative acknowledge resources a count of a number of user equipments for which the particular semi-persistent scheduling acknowledge/negative acknowledge resource is configured but some other semi-persistent scheduling acknowledge/negative acknowledge resource is allocated during semi-persistent scheduling activation;
   forming a fourth metric for each member of the set of semi-persistent scheduling acknowledge/negative acknowledge resources as a combination of the first metric, the second metric and the third metric;
   selecting $N$ semi-persistent scheduling acknowledge/negative acknowledge resources from the set of semi-persistent scheduling acknowledge/negative acknowledge resources to potentially configure for a new semi-persistent-scheduling configured user equipment based at least on the value of the fourth metric; and
   selecting one of the $N$ semi-persistent scheduling acknowledge/negative acknowledge resources of the $N$ semi-persistent scheduling acknowledge/negative acknowledge resources based at least on the value of the fourth metric when the user equipment is activated for semi-persistent scheduling operation.

2. The method as in claim 1, where N is equal to four.

3. The method as in claim 1, where forming the fourth metric as the combination of the first, second and third metrics comprises forming a weighted sum of the first metric, the second metric and the third metric.

4. The method as in claim 1, where selecting one of the $N$ semi-persistent scheduling acknowledge/negative acknowledge resources based at least on the value of the fourth metric selects the one of N semi-persistent scheduling acknowledge/negative acknowledge resources having a smallest value of the fourth metric.

5. The method as in claim 1, further comprising determining N semi-persistent scheduling acknowledge/negative acknowledge resources from the set of semi-persistent scheduling acknowledge/negative acknowledge resources to potentially configure for a new semi-persistent-scheduling configured user equipment such that a number of sub-frames in which semi-persistent scheduling can be activated for this user equipment is maximized.

6. The method as in claim 1, comprising determining which one of the N semi-persistent scheduling acknowledge/negative acknowledge resources to activate at the time of semi-persistent scheduling activation for the user equipment based on a data structure having a plurality of entries corresponding to a plurality of semi-persistent scheduling acknowledge/negative acknowledge resources, each entry further comprising the first metric, the second metric, the third metric and the fourth metric associated with the corresponding semi-persistent scheduling acknowledge/negative acknowledge resource, where the resource that is determined to be activated for the user equipment is one of the N resources that is selected in consideration of the first metric, the second metric and the third metric as indicated by having the smallest value of the fourth metric.

7. The method as in claim 1, comprising a preliminary step of determining a number of semi-persistent scheduling acknowledge/negative acknowledge resources to reserve in a set of physical uplink control channel resources by making an estimate based on an assumption that a load of semi-persistent scheduling user equipments will be equally spread across all sub-frames, and allowing for additional headroom to account for any non-uniform loading across sub-frames.

8. The method as in claim 1, where the semi-persistent scheduling acknowledge/negative acknowledge resources are physical uplink control channel resources.

9. The method as in claim 1, performed at least partially by a resource scheduler function located at an evolved NodeB.

10. A non-transitory computer-readable medium that contains software program instructions, where execution of the software program instructions by at least one data processor results in performance of operations that comprise execution of the method of claim 1.

11. An apparatus, comprising:
at least one data processor; and
at least one memory including computer program code, where the at least one memory and computer program code are configured, with the at least one data processor, to cause the apparatus at least to determine a set of (semi-persistent scheduling acknowledge/negative acknowledge semi-persistent scheduling acknowledge/negative acknowledge) resources, to configure as a first metric for each member of the set of semi-persistent scheduling acknowledge/negative acknowledge resources a count of a number of user equipments for which the semi-persistant scheduling acknowledge/negative acknowledge resource has been configured but for which semi-persistant scheduling is not activated; to configure as a second metric for each member of the set of semi-persistent scheduling acknowledge/negative acknowledge resources a count of a number of sub-frames in which the semi-persistent scheduling acknowledge/negative acknowledge resource has been activated for a UE; to configure as a third metric for each member of the set of semi-persistent scheduling acknowledge/negative acknowledge resources a count of a number of UEs for which the particular semi-persistent scheduling acknowledge/negative acknowledge resource is configured but some other semi-persistent scheduling acknowledge/negative acknowledge resource is allocated during semi-persistent scheduling activation; to form a fourth metric for each member of the set of semi-persistent scheduling acknowledge/negative resources as a combination of the first metric, the second metric and third metric; and to select N semi-persistent scheduling acknowledge/negative acknowledge resources from the set of semi-persistent scheduling acknowledge/negative acknowledge resources to potentially configure for a new semi-persistent-scheduling configured user equipment based at least on the value of the fourth metric, and to select one of the N semi-persistent scheduling acknowledge/negative acknowledge resources of the N semi-persistent scheduling acknowledge/negative acknowledge resources based at least on the value of the fourth metric when the user equipment is activated for semi-persistent scheduling operation.

12. The apparatus as in claim 11, where N is equal to four.

13. The apparatus as in claim 11, where the at least one memory and computer program code are further configured, with the at least one data processor, to form the fourth metric as the combination of the first, second and third metrics comprises forming a weighted sum of the first metric, the second metric and the third metric.

14. The apparatus as in claim 11, where the at least one memory and computer program code are further configured, with the at least one data processor, to select the N semi-persistent scheduling acknowledge/negative acknowledge resources based at least on the value of the fourth metric by selecting the N semi-persistent scheduling acknowledge/negative acknowledge resources having a smallest value of the fourth metric.

15. The apparatus as in claim 11, where the at least one memory and computer program code are further configured, with the at least one data processor, to determine N semi-persistent scheduling acknowledge/negative acknowledge resources from the set of semi-persistent scheduling acknowledge/negative acknowledge resources to potentially configure for a new semi-persistent-scheduling configured user equipment such that a number of sub-frames in which semi-persistent scheduling can be activated for this user equipment is maximized.

16. The apparatus as in claim 11, where the at least one memory and computer program code are further configured, with the at least one data processor, to determine which one of the N semi-persistent scheduling acknowledge/negative acknowledge resources to activate at the time of semi-persistent scheduling activation for the user equipment based on a data structure stored in said memory, the data structure having a plurality of entries corresponding to a plurality of semi-persistent scheduling acknowledge/negative acknowledge resources, each entry further comprising the first metric, the second metric, the third metric and the fourth metric associated with the corresponding semi-persistent scheduling acknowledge/negative acknowledge resource, where the resource that is determined to be activated for the user equipment is one of the N resources that is selected in consideration of the first metric, the second metric and the third metric as indicated by having the smallest value of the fourth metric.

17. The apparatus as in claim 16, where the at least one memory and computer program code are further configured, with the at least one data processor, to select the N semi-persistent scheduling acknowledge/negative acknowledge resources from the set of semi-persistent scheduling acknowledge/negative acknowledge resources based on the data structure having the plurality of entries corresponding to the plurality of semi-persistent scheduling acknowledge/ negative acknowledge resources, where the $N$ semi-persistent scheduling acknowledge/negative acknowledge resources that are selected for the user equipment are based on a consideration of the first metric, the second metric and the third metric as indicated by having the smallest values of the fourth metric.

18. The apparatus as in claim 11, where the at least one memory and computer program code are further configured, with the at least one data processor, to initially determine a number of semi-persistent scheduling acknowledge/negative acknowledge resources to reserve in a set of physical uplink control channel resources by making an estimate based on an assumption that a load of semi-persistent scheduling user equipments will be equally spread across all sub-frames, and allowing for additional headroom to account for any non-uniform loading across sub-frames.

19. The apparatus as in claim 11, where the semi-persistent scheduling acknowledge/negative acknowledge resources are physical uplink control channel resources.

20. The apparatus as in claim 11, embodied at least partially by a resource scheduler function located at an evolved NodeB.

\* \* \* \* \*

UNITED STATES PATENT AND TRADEMARK OFFICE
CERTIFICATE OF CORRECTION

PATENT NO. : 8,873,490 B2
APPLICATION NO. : 13/546373
DATED : October 28, 2014
INVENTOR(S) : Kalyanasundaram et al.

Page 1 of 1

It is certified that error appears in the above-identified patent and that said Letters Patent is hereby corrected as shown below:

In the Claims

Claim 11, col. 15, line 48 "(semi-persistent" should be deleted and -- semi-persistent -- should be inserted.

Claim 11, col. 15, line 49 "semi-persistent" should be deleted and -- (semi-persistent -- should be inserted.

Signed and Sealed this
Third Day of March, 2015

Michelle K. Lee
*Deputy Director of the United States Patent and Trademark Office*